United States Patent
Crane

(10) Patent No.: US 10,817,703 B2
(45) Date of Patent: Oct. 27, 2020

(54) CAPTURING ELECTRONIC SIGNATURES VIA CAPTIVE PORTAL

(71) Applicant: Darien Crane, Milpitas, CA (US)

(72) Inventor: Darien Crane, Milpitas, CA (US)

(73) Assignee: Darien Crane, Milpitas, CA (US)

( * ) Notice: Subject to any disclaimer, the term of this patent is extended or adjusted under 35 U.S.C. 154(b) by 155 days.

(21) Appl. No.: 16/133,168

(22) Filed: Sep. 17, 2018

(65) Prior Publication Data

US 2019/0087639 A1 Mar. 21, 2019

Related U.S. Application Data

(60) Provisional application No. 62/559,291, filed on Sep. 15, 2017, provisional application No. 62/655,231, filed on Apr. 10, 2018.

(51) Int. Cl.
| | |
|---|---|
| *G06K 9/00* | (2006.01) |
| *G06F 3/041* | (2006.01) |
| *G06F 3/0488* | (2013.01) |
| *G06Q 10/10* | (2012.01) |

(52) U.S. Cl.
CPC ....... *G06K 9/00154* (2013.01); *G06F 3/0416* (2013.01); *G06F 3/04883* (2013.01); *G06K 9/00442* (2013.01); *G06Q 10/10* (2013.01)

(58) Field of Classification Search
CPC ...... G07F 19/207; G07F 19/20; G06F 21/645; G06F 3/0416; G06F 3/04883; G06Q 10/10; G06K 9/00442; G06K 9/00154
USPC ........................................................ 382/119
See application file for complete search history.

(56) References Cited

U.S. PATENT DOCUMENTS

| | | | | |
|---|---|---|---|---|
| 2004/0064330 | A1* | 4/2004 | Keelan | G06Q 10/1053 705/321 |
| 2010/0116877 | A1* | 5/2010 | Parmelee | G07F 17/42 235/379 |
| 2011/0314371 | A1* | 12/2011 | Peterson | G06F 40/186 715/234 |
| 2013/0159720 | A1* | 6/2013 | Gonser | G06F 21/32 713/176 |
| 2013/0318354 | A1* | 11/2013 | Entschew | H04L 9/3263 713/175 |
| 2014/0164909 | A1* | 6/2014 | Graff | G06F 16/957 715/234 |
| 2014/0305352 | A1* | 10/2014 | Dowling | G07C 9/27 109/38 |
| 2017/0322681 | A1* | 11/2017 | Allison | G06F 3/04817 |

* cited by examiner

*Primary Examiner* — Ali Bayat

(57) ABSTRACT

A capture device obtains customer data and electronic signatures via a captive portal. The capture device analyzes a digital form provided by a user and automatically configures a digital version of the form for signing. When a client device associated with a customer connects to the capture device, the capture device triggers a captive portal to appear on the client device. The capture device renders the digital form within the captive portal. The customer can then fill out, electronically sign, and submit the form. The capture device generates an audit trail for the electronically signed form based on identifying data captured transparently from the client device. The capture device establishes a secure connection with the client device for enhanced security and to prevent the client device from displaying security warnings.

20 Claims, 11 Drawing Sheets

CAPTURING ELECTRONIC SIGNATURES VIA CAPTIVE PORTAL

CROSS-REFERENCE TO RELATED APPLICATIONS

This application claims the priority benefit of United States provisional patent application titled, "Capturing Electronic Signatures via Captive Portal," filed on Sep. 15, 2017 and having Ser. No. 62/559,291, and United States provisional patent application titled, "Encrypting Captive Portals on Isolated Web Servers," filed on Apr. 10, 2018 and having Ser. No. 62/655,231. The subject matter of each of these related applications is hereby incorporated by reference.

BACKGROUND

Field of the Various Embodiments

Embodiments of the present invention relate generally to electronic signatures and, more specifically, capturing electronic signatures via captive portal.

Description of the Related Art

Businesses often need to collect information associated with customers. Such information could include, for example, the first name, last name, address, telephone number, and social security number, associated with a given customer, among others types of information. Businesses also sometimes require the signature of a customer for various reasons. A common approach is to ask each customer to fill out and sign a paper form. The paper form includes fields indicating the specific types of information needed and any signature fields where the customer is meant to sign. Paper forms suffer from several deficiencies.

In particular, filling out a paper form is a tedious process for the customer. In addition, after receiving the form, the business usually must manually enter the customer information into a computer system. Manual data entry is time consuming and error prone. Finally, the business may be required to retain the paper copy of the form even after the customer information is entered into the computer system. Paper copies accumulate and consume space at the business location. To reduce or eliminate paper forms, many businesses have opted to "go paperless."

Going paperless generally means creating digital versions of paper forms that can be filled out electronically. When a business also requires the signature of a customer, going paperless also implies implementing an electronic signature (eSignature) system to capture legal eSignatures. A conventional eSignature system typically allows a business to generate a digital version of a paper form (a "digital form") that can be filled out and signed electronically in accordance with the various laws governing eSignatures. However, conventional eSignature systems suffer from specific drawbacks.

In particular, the business is required to perform a lengthy process to generate the digital form. First, the paper version of the form is scanned into a portable document format (PDF). The PDF is then manually uploaded to the eSignature system. The business then manually identifies, via a graphical user interface, every single field that needs to be filled out by the customer. The business also indicates specific locations on the PDF where the customer should sign. Because paper forms typically have numerous fields and multiple signing areas, generating digital forms to capture eSignatures can be very time consuming.

In addition, conventional eSignature systems often require the customer to undergo a multi-step identity verification process to comply with eSignature legislation. For example, one verification process requires the customer to provide their email address to the business. The business then transmits an email to the customer that includes a tokenized link to the digital form. Only upon accessing this link can the customer fill out and sign the digital form. In practice, customers find this process to be a confusing and annoying way to fill out and sign a form.

Finally, after the customer fills out and signs the digital form, the business must still manually enter the customer data into a computer system, despite the fact that the desired customer information was already captured electronically.

As the foregoing illustrates, what is needed in the art are more effective techniques capturing data and electronic signatures from customers.

SUMMARY

Various embodiments include a computer-implemented method for generating electronically signed documents, including causing a captive portal to appear on a client device when the client device joins a first network, causing the captive portal to display a first web page, obtaining a first electronic signature from the client device based on a first user interaction with the first web page, and generating a first electronically signed document based on the first electronic signature.

At least one advantage of the disclosed techniques is that data and electronic signatures can be captured from customers via a streamlined workflow that need not involve customer facing hardware.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As noted above, conventional eSignature systems are cumbersome for businesses to setup and annoying for customers to use. To address these issues, embodiments of the invention include a capture device that obtains customer data and electronic signatures via a captive portal. The capture device analyzes a digital form provided by a user (typically a business) and automatically configures a digital version of the form for signing. When a client device associated with a customer connects to the capture device, the capture device triggers a captive portal to appear on the client device. The capture device renders the digital form within the captive portal. The customer can then fill out, electronically sign, and submit the form. The capture device generates an audit trail for the electronically signed form based on identifying data captured transparently from the client device. The capture device establishes a secure connection with the client device for enhanced security and to prevent the client device from displaying security warnings.

One technological advantage of the disclosed capture device is that businesses can automatically configure digital forms to be filled out and signed without needing to manually identify each and every field to be filled. Another technological advantage is that customers need not perform an annoying identity verification process in order to facilitate legal electronic signing, because the capture device collects this identifying information directly from the client device. Yet another technological advantage is that the capture device can encrypt network traffic without needing Internet access and without triggering browser warnings. Thus, the disclosed techniques represent multiple technological advancements compared to prior art techniques.

System Overview

Figure 1:
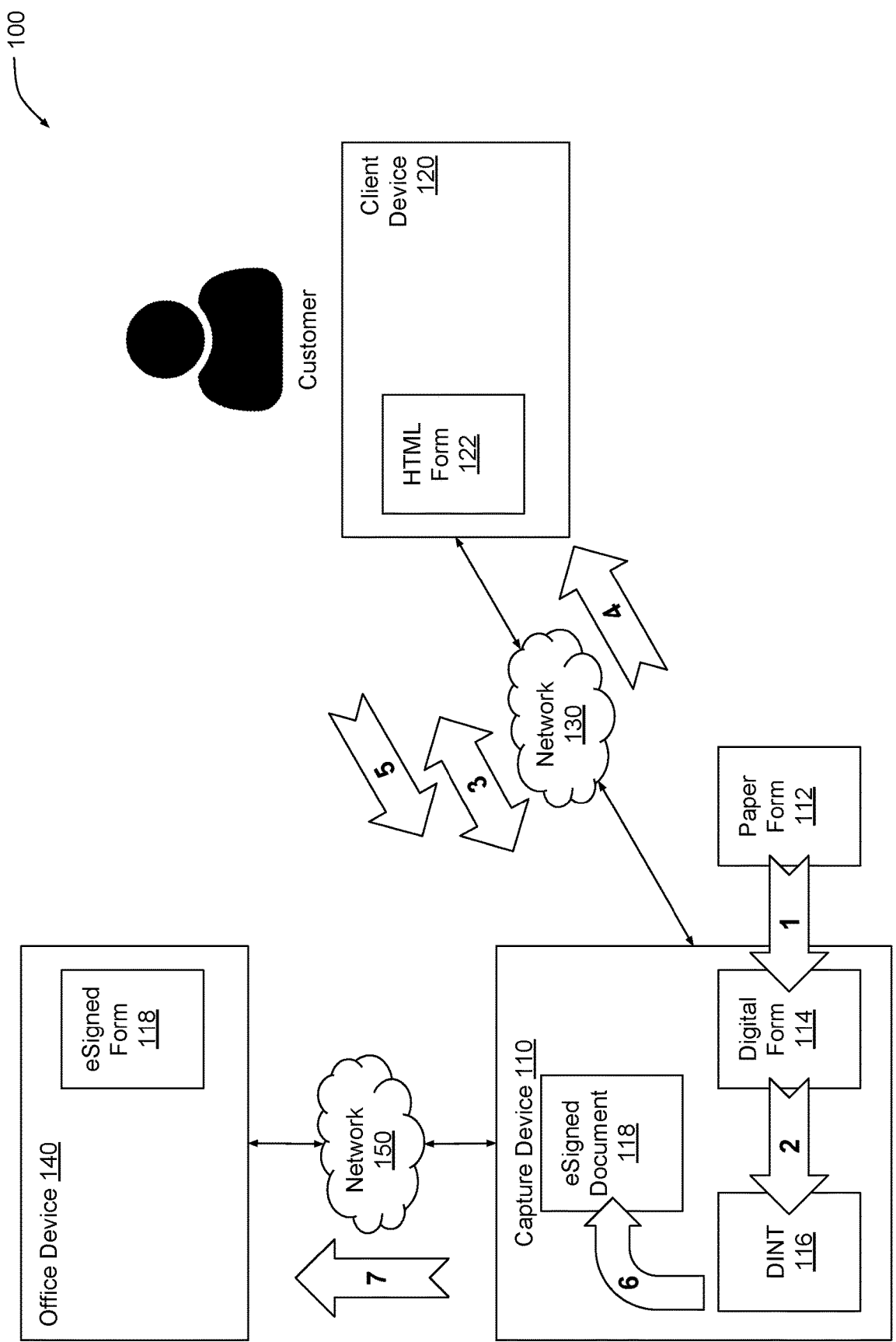
FIG. 1 illustrates a system configured to perform one or more aspects of the present invention.

FIG. 1 illustrates a system configured to perform one or more aspects of the present invention. As shown, system 100 includes capture device 110 and client device 120 coupled together via network 130 and office device 140 coupled to capture device 110 via network 150. Each of the devices shown can be implemented via any technically feasible form of computing device. Each of the networks shown can be implemented via any technically feasible type of network.

In operation, paper form 112 is digitized and uploaded to capture device 110 as digital form 114 (operation 1). Digital form 114 could be, for example, a portable document format (PDF) version of paper form 112. Capture device 110 generates a document interface (DINT) 116 based on digital form 114 (operation 2). Subsequently, client device 120 joins network 130. In response, capture device 110 triggers a captive portal to appear on client device 120 (operation 3). Capture device 120 generates HTML form 122 based on DINT 116 and transmits hypertext markup language (HTML) form 122 to be displayed via client device 120 (operation 4). Capture device 110 obtains customer data and/or one or more electronic signatures (eSignatures) associated with a customer from client device 120 (operation 5). Capture device 110 generates eSigned document 118 based on DINT 116 (operation 6). In so doing, capture device 110 generates an audit trail based on identifying data obtained from client device 110 and appends the audit trail to eSigned document 118. Capture device 110 saves eSigned document 118 and/or customer data to office device 140 (operation 7).

Generating a Document Interface

Figure 2:
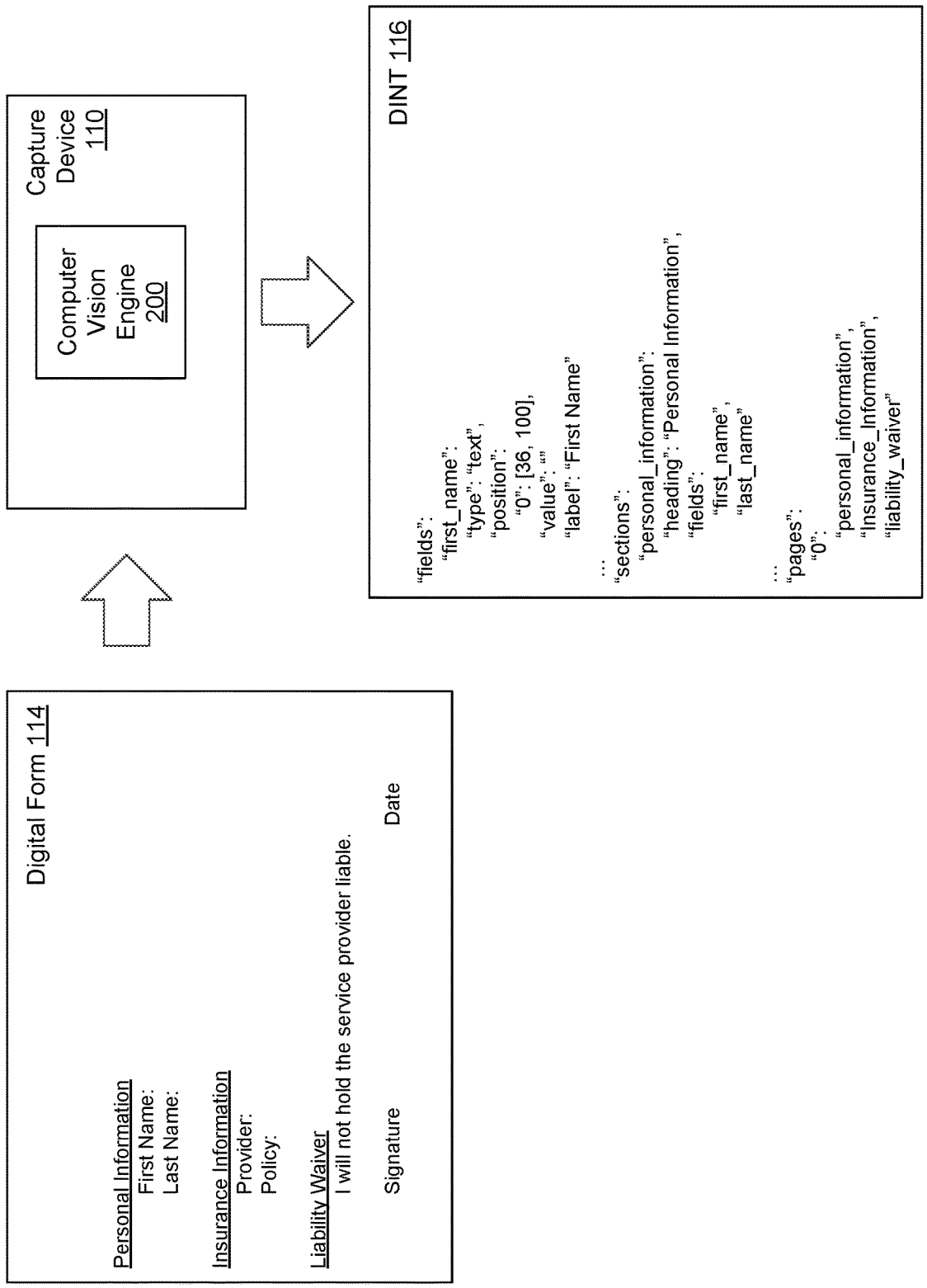
FIG. 2 illustrates how the capture device of FIG. 1 generates a document interface based on a digital form, according to various embodiments of the present invention.

FIG. 2 illustrates how the capture device of FIG. 1 generates a document interface based on a digital form, according to various embodiments of the present invention. As shown, capture device 110 includes a computer vision engine 200 that generates DINT 116 based on digital form 114.

In operation, capture device 110 implements computer vision engine 200 to automatically identify attributes of digital form 114, including:
Titles and subtitles
Structure and layout (e.g., sections and section headings)
Individual data capture fields and attributes thereof, including:
  a. Type of field (e.g., text, radio checkbox, multi-checkbox, signature, etc.)
  b. Field label (e.g.: "First name", "How long have you lived here?")
  c. X, Y field coordinates
Page numbers Automatically identifying form attributes is especially useful when digital form 114 does not have fillable form fields that can be automatically detected. Computer vision engine 200 implements machine learning or any other technically feasible form of trainable machine intelligence. Computer vision engine 200 can be trained with a curated training set to identify relevant portions of forms using object recognition and feature extraction, among other techniques. Based on the identified form attributes, capture device 110 generates DINT 116.

DINT 116 is a bidirectional mapping between digital form 114 and HTML form 122. Relative to digital form 114, DINT 116 defines specific attributes of HTML form 122, including:
Structure and layout of HTML
HTML input elements for receiving customer data, including:
  a. Radio checkboxes (yes/no)
  b. Multi-option checkboxes
  c. Options with conditional text input
    i. E.g., "If other, please explain: _____"
Any other identifiable form input Relative to HTML form 122, DINT 116 also includes blank field values for storing customer data and eSignatures captured via HTML form 122. DINT 116 also includes positioning and/or placement information describing how and where that customer data is inserted into digital form 114 to generate eSigned document 118.

Triggering a Captive Portal

Figure 3:
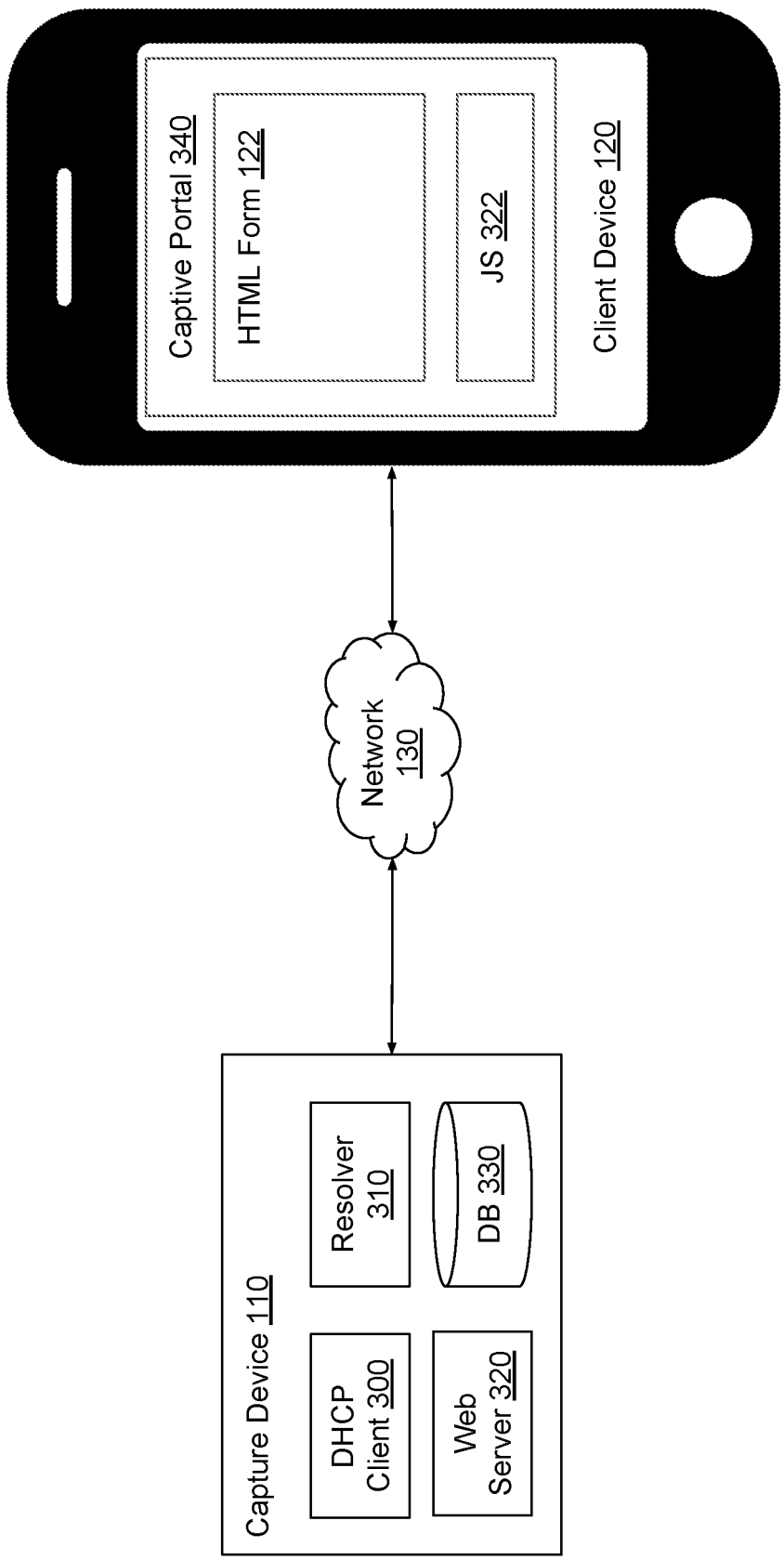
FIG. 3 illustrates how the capture device of FIG. 1 causes a form to appear on a client device, according to various embodiments of the present invention.

FIG. 3 illustrates how the capture device of FIG. 1 causes a form to appear on a client device, according to various embodiments of the present invention. As shown, capture device 110 includes dynamic host configuration protocol (DHCP) 300, domain name server (DNS) resolver (resolver) 310, web server 320, and database 330. As also shown, client device 120 includes captive portal 340 configured to display HTML form 122 and execute JavaScript (JS) 322.

In operation, capture device 110 executes a soft access point (AP) that configures a network interface to generate network 130. Network 130 could be, for example, an ad-hoc WiFi network. In one embodiment, capture device 110 is a Raspberry Pi configured to generate a WiFi hotspot. Capture device 110 Implements DHCP 300 to lease an internet protocol (IP) address to client device 120 when client device 120 joins network 130. Capture device 110 implements resolver 320 to resolve domain names included in web requests received from client device to a local IP address associated with capture device 110. The local IP address could be, for example, "localhost," "127.0.0.1," or a static IP address assigned to capture device 110. Resolver 310 resolves some or all domain names to the local IP address.

Web server 320 services incoming web requests that target the local host IP address. Accordingly, web server 320 can handle web requests targeting any domain because resolver 310 resolves these domains to the local IP address. Web server 320 serves specific HTML pages located at specific uniform resource locators (URLs). Web server 320 redirects web requests that do not target any of these specific URLs to a specific "capture" URL. In practice, web server 302 redirects web requests to http://portal.wiforms.com. In so doing, web server 320 issues a 302 redirect. In response to receiving a 302 redirect, client device 120 launches captive portal 340. For example, if client device 120 executes the iOS operating system, then client device 120 would launch the Captive Network Assistant (CNA) upon detecting a 302 redirect of an automated request to "captive.apple.com/hotspot-detect.html" or the like.

Captive portal 340 accesses the captive URL and loads content associated with that URL, including HTML form 122 and JS 322. HTML form 122 is an HTML version of digital form 114 that is generated by capture device 110 based on DINT 116, as described in greater detail below. Captive portal 340 causes JS 322 to execute on client device 120 in order to facilitate the capturing of touch events on client device 120. In particular, JS 322 captures images of signatures that customers draw on a touchscreen of client device 120.

Generating an HTML Form

Figure 4:
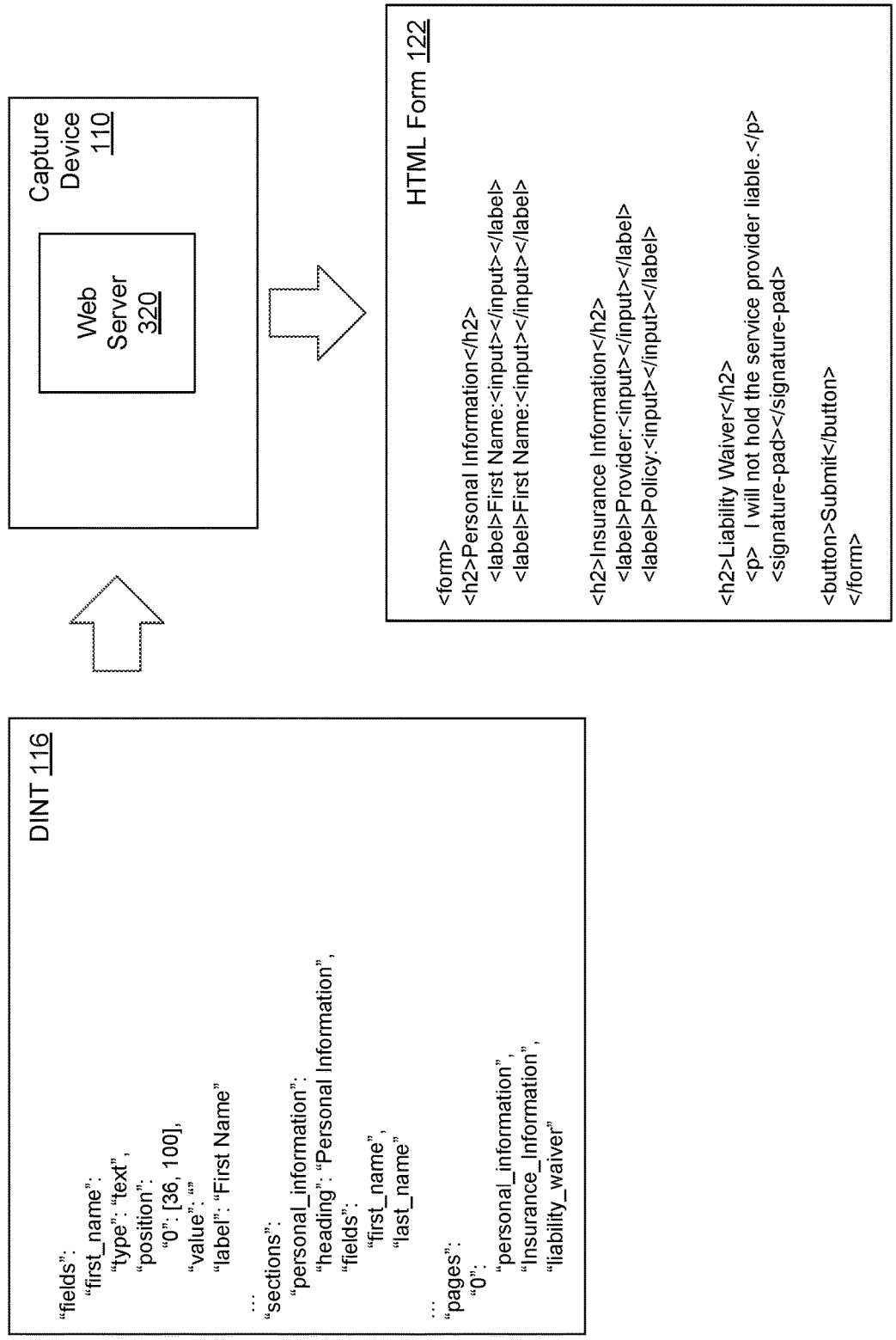
FIG. 4 illustrates how the capture device of FIG. 1 renders a form based on a document interface, according to various embodiments of the present invention.

FIG. 4 illustrates how the capture device of FIG. 1 renders a form based on a document interface, according to various embodiments of the present invention. As shown, web server 340 generates HTML form 122 based on DINT 116.

In operation, web server 320 generates HTML elements that are defined in DINT 116. In practice, web server 320 implements a template to generate HTML form 122 based on DINT 116. In one embodiment, web server 320 may transmit DINT 116 to JS 322 to facilitate dynamic rendering of HTML form 122 within captive portal 340. DINT 116 defines the structure, organization, and layout of HTML form 122, as mentioned, including labels to be associated with different fields and the ordering with which those fields should appear within HTML form 122. HTML form 122 typically does not appear identical to digital form 114, but nonetheless includes similar or the same data capture fields and is therefore functionally and/or structurally similar.

Capturing Customer Data and eSignatures

Figure 5:
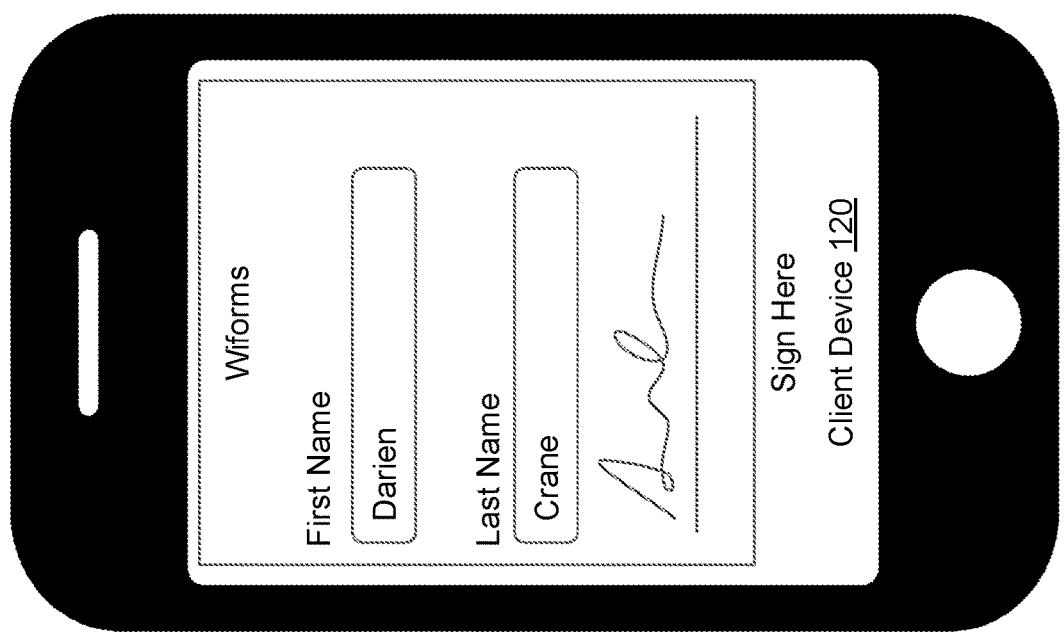
FIG. 5 illustrates how a form is signed on the client device of FIG. 1, according to various embodiments of the present invention.

FIG. 5 illustrates how a form is signed on the client device of FIG. 1, according to various embodiments of the present invention. As shown, client device 120 displays a form that can be filled out and signed by a customer. The displayed form is essentially a mobile-friendly HTML rendering of digital form 114.

In operation, HTML form 122 captures customer input, including customer consent to use eSignatures. JS 322 executes a signature application to capture touch events from a touch screen of client device 120 and generate images of signatures. JS 322 may also capture other data to be included in an audit trail associated with an eSignature, including:
  Client device IP and/or media access control (MAC) address
  Geolocation information obtained from client device 120
  Photo, fingerprint, body print (ear, knuckle, etc.), or other biometric information associated with customer
  Date/timestamp associated with any of the above Web server 320 may also extract some or all of the above information from web requests received from client device 120 to generate the audit trail. JS 322 serializes signature images and/or audit trail information along with form data for transmission to web server 320 via network 130.

Generating an eSigned Document

Figure 6:
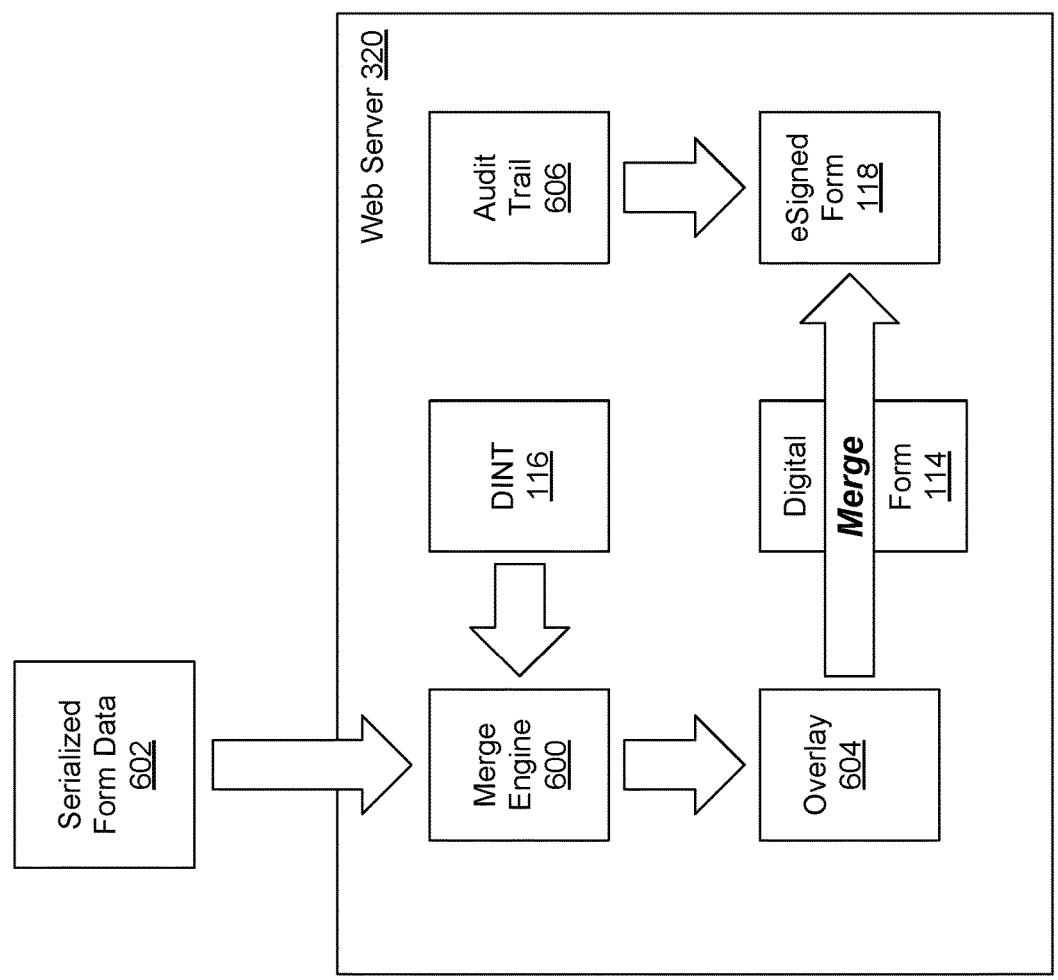
FIG. 6 illustrates how the web server of FIG. 3 generates an electronically signed form, according to various embodiments of the present invention.

FIG. 6 illustrates how the web server of FIG. 3 generates an electronically signed form, according to various embodiments of the present invention. As shown, web server 320 includes a merge engine 600.

In operation, merge engine 600 parses serialized form data 602 received from client device 120. HTML form 122 and/or JS 322 generate serialized form data 602 based on input received from the customer via captive portal 340. Merge engine 600 populates blank field values included in DINT 116 with corresponding values included in serialized form data 602. For example, DINT 116 could describe a field for "First Name" (as shown in FIGS. 2 and 4) and merge engine 600 could populate an initially blank value of this field with a customer-provided first name. DINT 116 also indicates positioning and placement data associated with the field, including the page(s) of digital form 116 where the customer data should appear and the position(s) within the page(s) where the customer data should be placed.

Once merge engine 600 populates DINT 116, merge engine 600 generates overlay 604 based on the populated DINT 116. Overlay 604 includes populated field values derived from DINT 116 that are placed according to the positioning and placement information included in DINT 116. In one embodiment, merge engine 600 generates overlay 604 with the same file format as digital form 114. Merge engine 600 merges each page of overlay 604 with a corresponding page of digital form 114 to generate eSigned form 118. Merge engine 604 also generates audit trail 606 for compliance with electronic signature laws using any of the identifying data described above. Audit trail 606 can be encoded into a quick response (QR) code, combined with an eSignature, then merged into eSigned form 118. Audit trail 606 may also be appended to eSigned form 118 in human readable form.

Capture device stores eSigned form 118 in database 330 shown in FIG. 5 and/or transmits eSigned form to office device 140. Capture device 110 also populates database 330 with customer data derived from serialized customer data 602 and/or transmits any of this data to office device 140.

Saving Customer Data to Office Device

Figure 7:
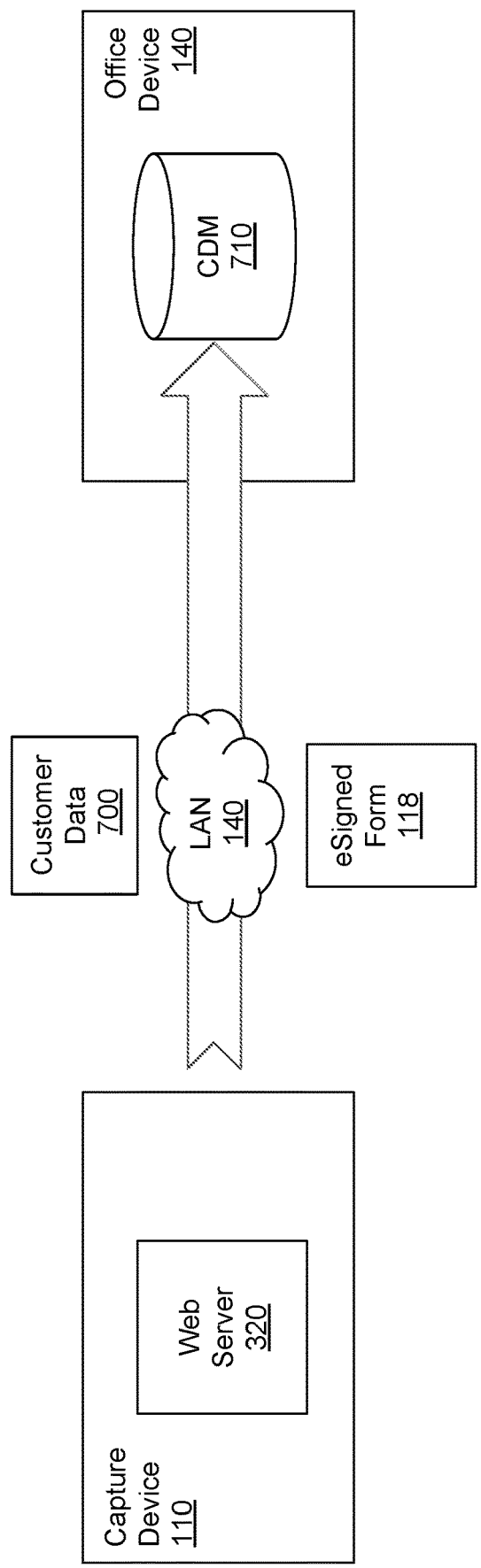
FIG. 7 illustrates how the capture device of FIG. 1 populates a database with customer data, according to various embodiments of the present invention.

FIG. 7 illustrates how the capture device of FIG. 1 populates a database with customer data, according to various embodiments of the present invention. As shown, capture device 110 transmits customer data 700 and eSigned form 118 to office device 140.

In operation, capture device 110 interfaces with a file system of office device 140 to place eSigned form 118 in an appropriate location. Capture device 110 integrates with a customer data management (CDM) 710 on office device 140 and updates CDM 710 with customer data 700. Capture device 110 generally interfaces with office device 140 to allow a business to:

- Scan paper forms into capture device 110
- Verify eSigned forms received from capture device 110
- Confirm in-person signing
- Select forms to be sent to client device 120 via capture device 110
- Perform various configurations of capture device 110

Delineation of Advantages

- Customer is not forced to use a paper form
  - Instead uses own mobile device to enter data
  - No customer-facing hardware such as shared tablets required
  - Form auto-fill available via mobile browser
- Customer sees digital form immediately upon joining hotspot
  - Convenient user experience
  - Forms are locally served and therefore fundamentally secure
- eSignature compliance is ensured without requiring email confirmation
  - Identifying data is more easily available via mobile device
  - Identification occurs transparently and without user action
  - Customer is physically present, therefore business can usually verify that customer did indeed sign personally (if needed)
- Digital form and corresponding data entry fields are automatically generated
  - Business is not required to identify each field to generate digital form
- Customer data is sent directly to CDM
  - All electronic data entry transferred to customer
  - Business can avoid manual data entry, thereby reducing data errors
- Addresses long felt need to provide simple in-person eSignature functionality

Additional Concepts

In various embodiments, system 100 may implement any of the following additional features:

JS 322 may process payments made from customer to business by interacting with payment processing utility running on (or connected to) capture device 110. JS 322 may use local storage of browser on client device 110 to store customer data and signatures, thereby facilitating future interactions with other capture devices. Client device 110 may autofill form fields and/or autofill future signatures. JS 322 may interact with installed apps on client device 110 to extend functionality.

Network 130 may be deployed by software executing on office device 140. The software may interface with a network interface card (NIC) or WiFi adapter within office device 140 or a router coupled thereto. The software could also interface with an external plugin NIC to generate an ad hoc network that is separate from network 150.

Client device 110 may connect to the Internet and allow selective DNS resolution to a certificate authority, thereby allowing captive portal 340 to display HTTPS in browser bar. A related approach is described below in conjunction with FIGS. 10-11.

Capture device 110 may provide an identifier to the customer for easy retrieval of customer data. This identifier may be included in HTML form 122 when rendered or transmitted to client device 120 on form submit. For example, capture device 110 could transmit a CDM record number generated after customer data is saved. The identifier may be added to an eSigned document and associated with customer data 700. The customer may provide the identifier to the business to facilitate retrieval of information. This approach may be useful in situations where many customers wait in line and fill out same form. After the customer submits the form and reaches the head of the line, the customer provides the business with the identifier for data retrieval.

For example, capture device 110 could be deployed in a hotel to facilitate rapid hotel registration and/or check in. When a guest arrives at the hotel, the guest uses client device 110 (typically a mobile device, such as a cell phone) to join network 130. Upon joining network 130, captive portal 340 appears and displays a registration form, release of liability, terms of service, and other information and/or disclosures associated with hotel registration. Via the registration form, the guest provides various data and/or eSignatures, including any data typically needed for hotel registration, such as credit card information. Upon submission, capture device 110 generates eSigned form 118 and stores this form to office device 140 (typically owned and/or operated by the hotel). Capture device 110 also stores guest data to CDM 710 on office device 140. In this example, CDM 710 could be a reservation management system. CDM 710 could charge a credit card associated with the guest. Capture device 110 could obtain an identifier associated with a reservation generated for the guest and then provide this to the guest. The guest could then provide this identifier to the front desk in order to select a room and/or obtain a room key. This approach could greatly reduce the typically lengthy wait times associated with hotel registration at very popular hotels and/or casinos.

In one embodiment, capture device 110 may cause a game to appear within captive portal 340. The game may allow the guest to gamble with actual currency debited from a credit card provided by the guest. In another embodiment, capture device 110 may interact with office device 140 to access a rewards account associated with the guest and display rewards information to the guest via captive portal 340, such as number of rewards points earns, compensation levels, and so forth.

Generic Computing Device

Figure 8:
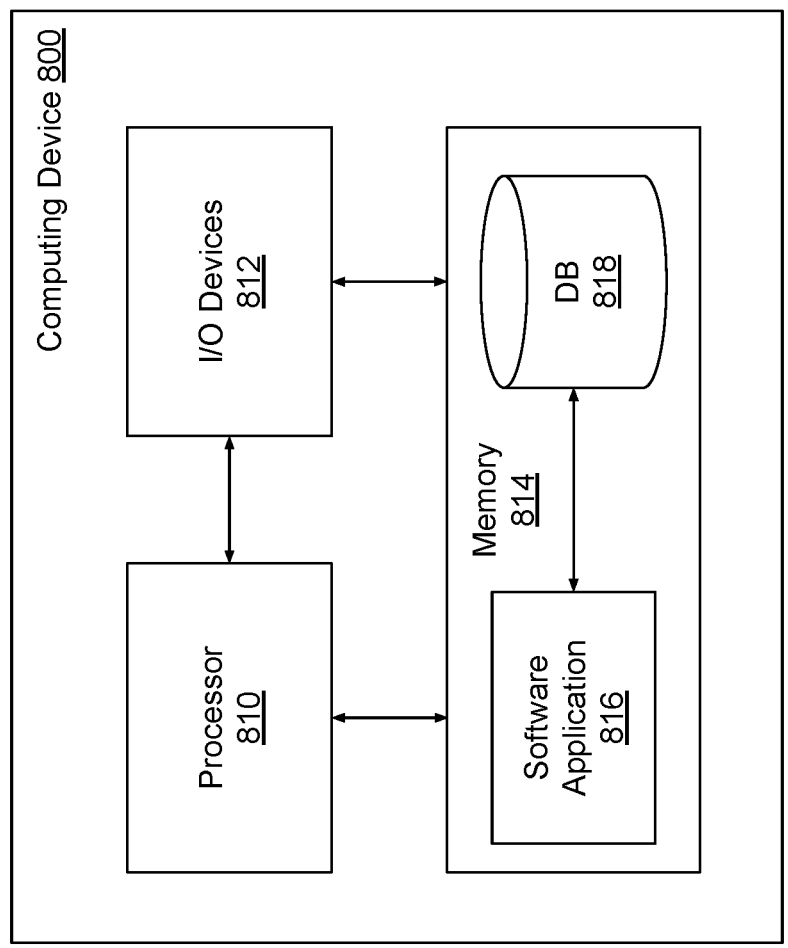
FIG. 8 illustrates a generic computing device that can be implemented in the system of FIG. 1, according to various embodiments of the present invention.

FIG. 8 illustrates a generic computing device that can be implemented in the system of FIG. 1, according to various embodiments of the present invention. As shown, computing device 800 includes processor 810, input/output (I/O) devices 812, and memory 814. Memory 814 includes software application 816 and database (DB) 818.

Processor 810 is any technically feasible hardware unit that can process data and execute applications. I/O devices 812 include input devices, output devices, and devices configured for both input and output. I/O devices 812 include one or more wireless NICs and/or one or more WiFi adapters. Memory 814 is any technically feasible storage medium. Software application 816 is program code that, when executed by processor, performs various operations discussed herein. Database 816 stores data generated/consumed by software application 814. Any of office device, capture device, client device, or other devices discussed herein may be implemented by an instance of generic computing device to perform any relevant functionality discussed above.

Procedure For Capturing Data and Electronic Signatures Via Captive Portal

Figure 9:
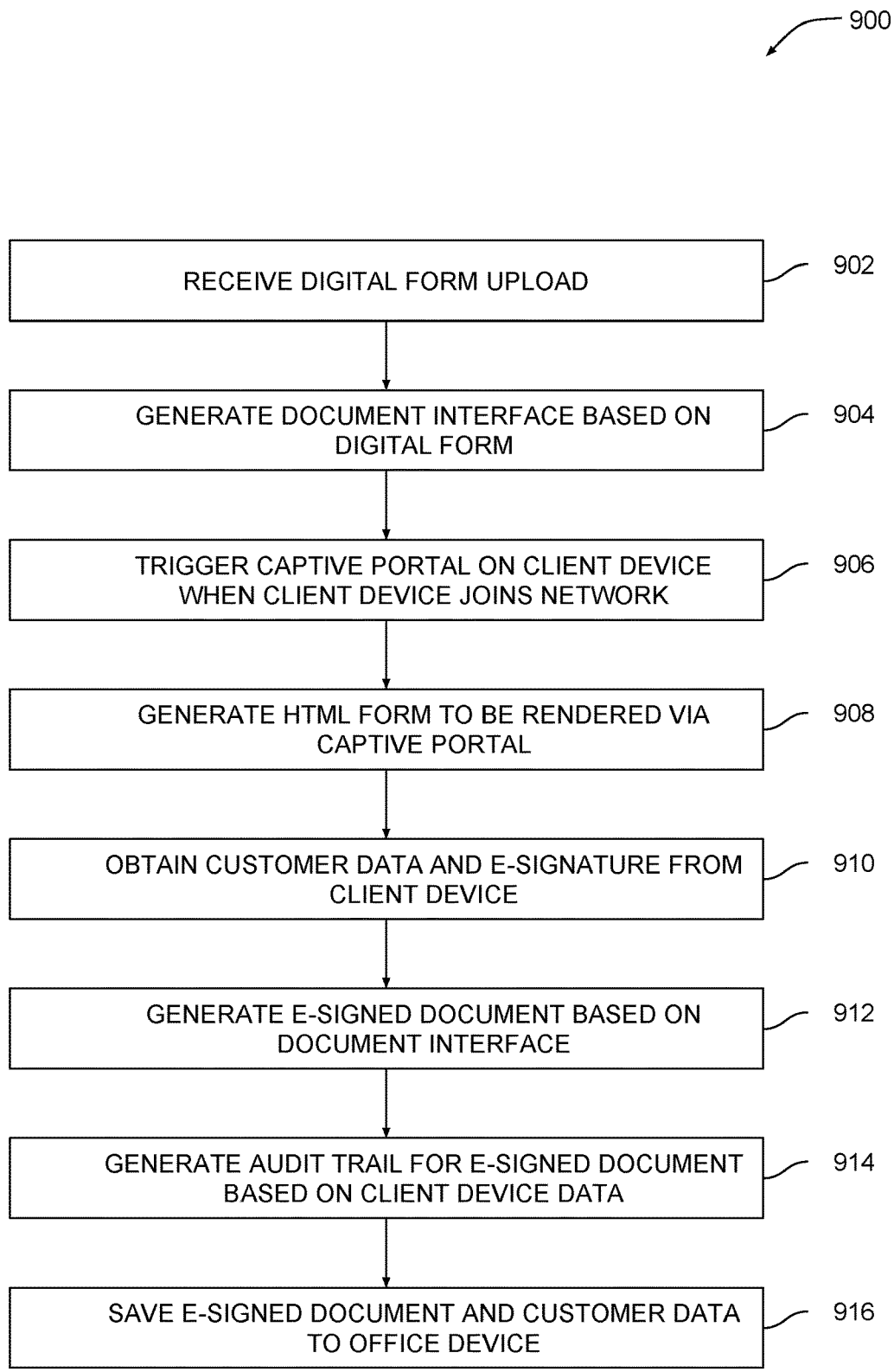
FIG. 9 is a flow diagram of method steps for capturing an electronic signature via a captive portal, according to various embodiments of the present invention.

FIG. 9 is a flow diagram of method steps for capturing an electronic signature via a captive portal, according to various embodiments of the present invention. Although the method steps are described in conjunction with the systems of FIGS. 1-8, persons skilled in the art will understand that any system configured to perform the method steps in any order falls within the scope of the present invention.

As shown, a method 900 includes a sequence of steps capture device 110 performs to capture an eSignature. At step 902, capture device 110 receives a digital form upload, as illustrated in FIG. 1. At step 904, capture device 110 generates a document interface based on the digital form, as illustrated in FIG. 2. At step 906, capture device 110 triggers a captive portal to appear on a client device when the client device joins a network generated by the capture device, as illustrated in FIG. 3. At step 908, capture device 110 generates an HTML form to be rendered via the captive portal, as illustrated in FIG. 4. At step 910, capture device 110 obtains customer data and/or e-signature(s) from the client device, as illustrated in FIG. 5. At step 912, capture device 110 generates an e-signed document based on the document interface, as illustrated in FIG. 6. At step 914, capture device 110 generates an audit trail for the e-signed document based on client device data obtain from the client device, as also illustrated in FIG. 6. At step 916, capture device 110 saves the e-signed document and customer data to an office device, as illustrated in FIG. 7.

Encrypting Captive Portals on Isolated Web Servers

Encrypting network traffic via hypertext transfer protocol secure (HTTPS) is generally a good idea. Among other things, doing so can protect against data theft as well as avoid causing browser warnings to that sometimes appear when only HTTP is used. A web server facilitates HTTPS by transmitting a certificate to connected clients. A certificate may be considered "valid" when it is:

Issued by a trusted certificate authority (CA)
    Issued for the domain associated with the web server
    Not expired A browser executing on a client validates a certificate by:

Checking the certificate against a list of trusted CAs
    Checking that the domain matches the certificate
    Checking the expiration date of the certificate Upon detecting a valid certificate, a browser indicates in the address bar that the web server provides a secure connection. Such indications may have several different appearances, but typically a green lock icon is shown alongside the word "secure," and the URL is prepended with "https." Upon detecting an invalid certificate, a browser may issue a warning to the user indicating that the web server may be malicious and/or prevent the user from accessing the web server altogether. Accordingly, it is imperative that web servers encrypt network traffic using valid certificates in order to cause the browser to display the "secure" indication and not display alarming warnings.

Not all web servers are coupled to the internet. Some web servers are deployed for local access only and not meant for remote access across the internet. Such web servers are referred to herein as "isolated." Isolated web servers can be accessed via static IP addresses and across local networks. Traffic to and from these web servers typically cannot be encrypted with certificates issued by a CA because CAs don't issue certificates for IP addresses. Instead, isolated web servers often generate and use "self-signed" certificates to encrypt network traffic. However, browsers will not display the "secure" indication because self-signed certificates fail the first validity check (must be issued by a trusted CA).

WiFi hotspots typically implement a local web server that acts as a gateway to the Internet. The local web server registers users to access the Internet via a "captive portal." When a user joins the hotspot, the local web server intercepts web requests and redirects those requests to a locally-served registration page. The user's device detects this redirection and launches a lightweight browser to display the registration page (called Captive Network Assistant on iOS). A typical registration page requires the user to accept terms of service in order to be granted Internet access. Once the user registers, the local web server temporarily whitelists an IP address issued to the user device. Web requests received from this IP address are not redirected for a fixed period of time. The user can then access the Internet.

Beyond user registration, captive portals can also be used to gather user data via fillable forms and capture electronic signatures (as described above in conjunction with FIGS. 1-9). In such cases, the web server does not need an Internet connection. For example, capture device 110 of FIG. 1 need not be connected to the Internet in order to perform the techniques described above. In specific cases, the lack of an Internet connection is preferable. Among other things, the web server only requires power and no Internet subscription is needed. If Internet access is available but protected by a firewall, there is no need for the web server to be whitelisted by the firewall.

When setup to gather user information, network traffic through a captive portal should be encrypted in order to protect against data theft, provide users with a sense of security, and comply with industry standard best practices. However, encrypting network traffic through captive portals that are not connected to the Internet poses specific technical challenges.

Figure 10:
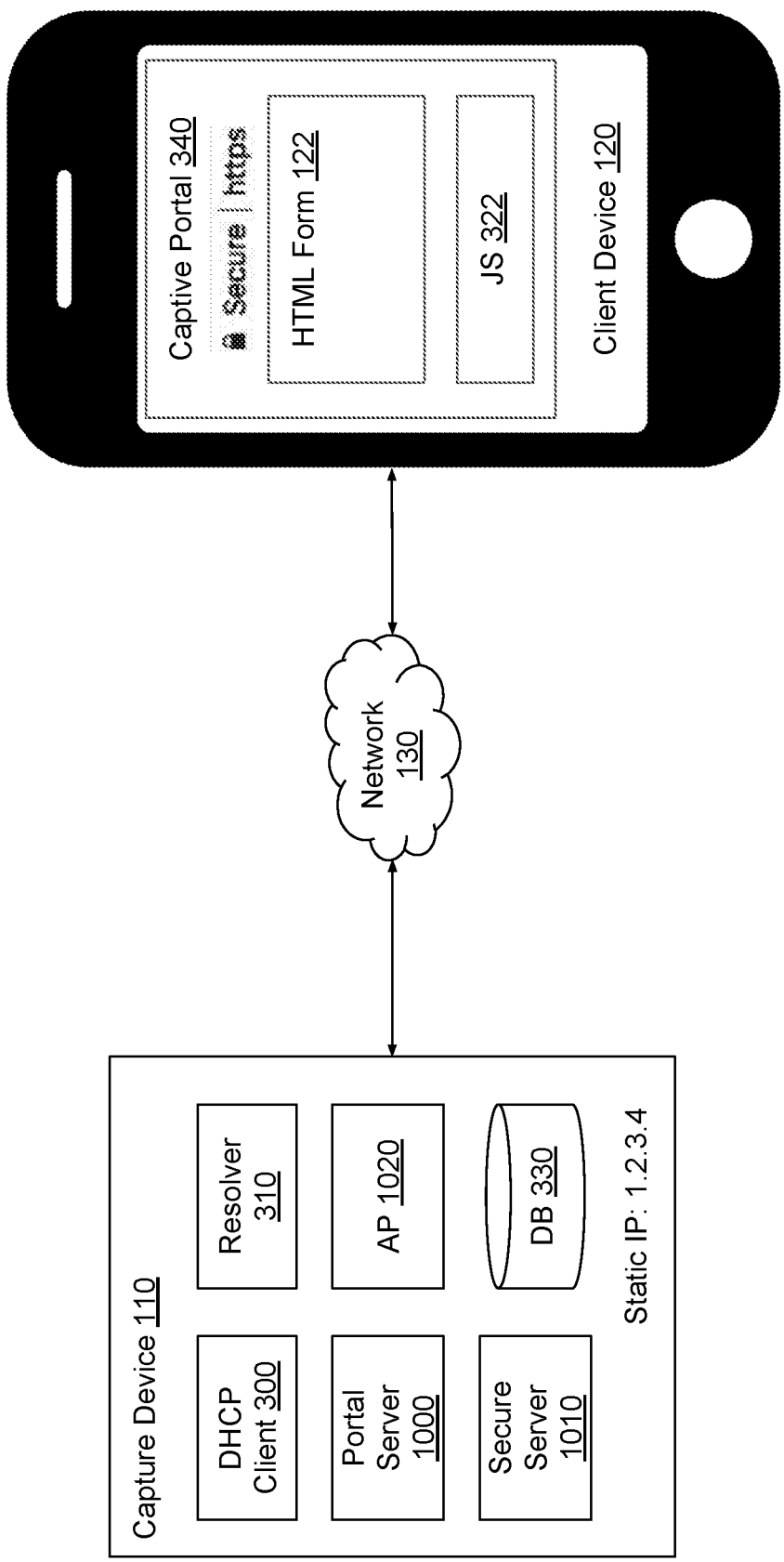
FIG. 10 illustrates how the capture device of FIG. 1 establishes a secure connection with a client device without causing browser warnings, according to various embodiments of the present invention.
Figure 11:
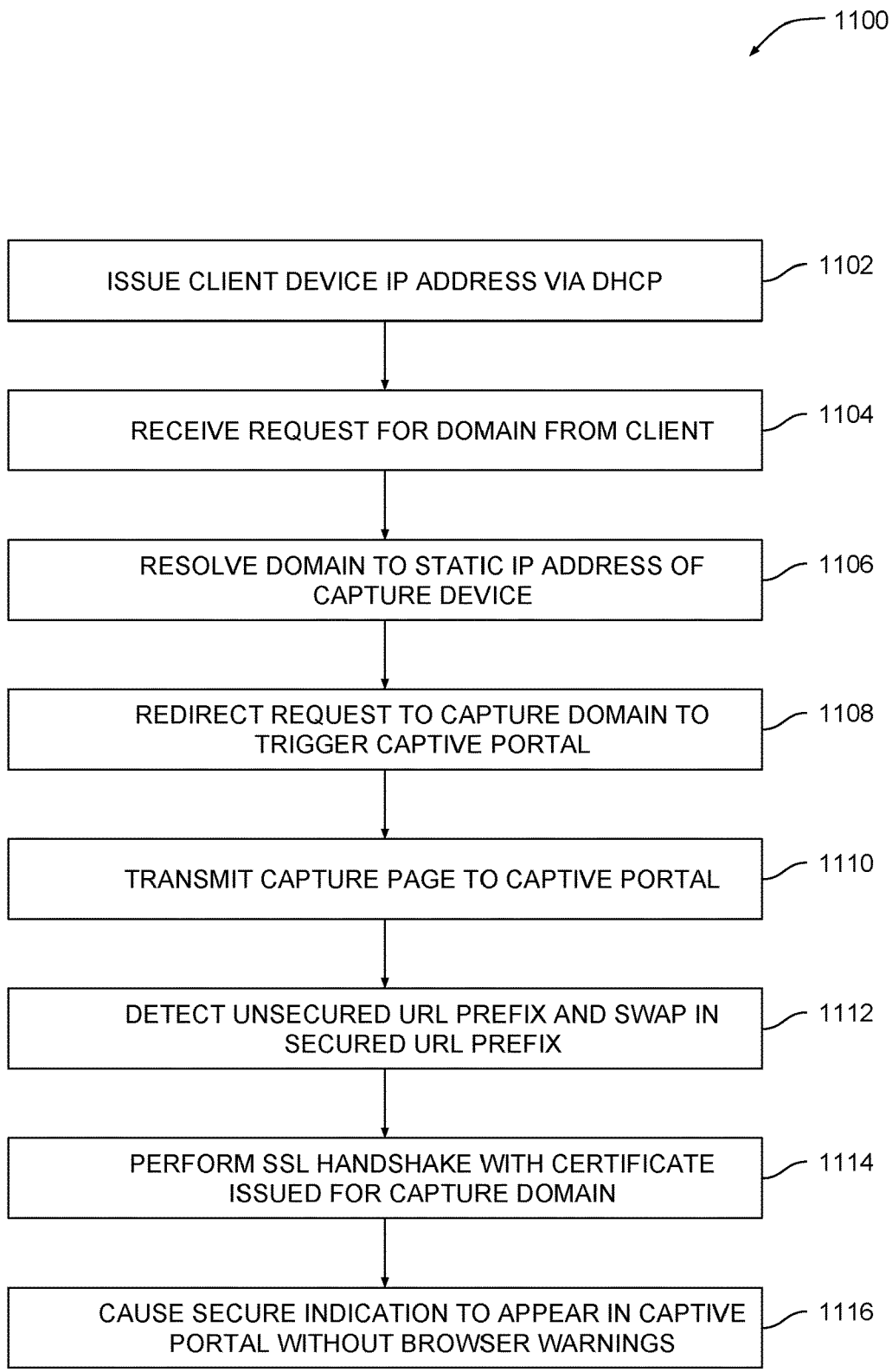
FIG. 11 is a flow diagram of method steps for establishing a secure connection between an isolated web server and a client device, according to various embodiments of the present invention.

Without internet access, the captive portal normally cannot access a name server and therefore cannot resolve domain names to IP addresses, mandating that IP addresses alone be used to direct network traffic. If the captive portal relies only on IP addresses, though, then self-signed certificates must be used to encrypt network traffic, which prevents browsers from displaying the "secure" indication. Additionally, in order to trigger the captive portal, the web server must issue a 302 redirect which can prevent and/or disrupt HTTPS and trigger a browser warning. Specifically, if asked to redirect into or away from HTTPS, the browser will issue a warning. Further, if asked to perform more than one redirect, the web server will issue an error 310: too many redirects. These various issues prevent isolated web servers from implementing industry-standard security practices. FIGS. 10-11 set forth an approach for addressing these issues.

FIG. 10 illustrates how the capture device of FIG. 1 establishes a secure connection with a client device without causing browser warnings, according to various embodiments of the present invention. As shown, capture device 110 includes portal server 1000, secure server 1010, and access point (AP) 1020.

Capture device 110 is configured with exemplary static IP address "1.2.3.4." AP 1020 is configured to generate network 130. DHCP 300 is configured to issue IP addresses to clients, as previously described. DNS 310 is configured to resolve any domain name to the static IP of capture device 110, as previously described. Portal server 1000 is configured to run on port 80 (HTTP) of capture device 110. Portal server 1000 is configured to redirect web requests to http://portal.wiforms.com. Portal server 1000 is configured to serve portal JS at site root ("/"). Secure server 1010 is configured to run on port 443 (HTTPS) of capture device 110. Secure server 1010 is configured to service requests using a certificate for *.wiforms.com that is issued by a trusted CA. Secure server 1010 serves HTML form 122 and JS 322. JS 322 generates images based on touch events.

In operation, client device 120 joins network 130. DHCP 300 issues client device 110 an IP address. Client device 120 sends a request to capture device 110 on port 80. The request could be, for example, an automated request sent by client device 120 to test for the presence of a captive portal. Resolver 310 resolves the domain associated with the request to a static IP of server machine. Portal server 1000 intercepts the request and redirects the request to http://portal.wiforms.com/, where portal.wiforms.com is the domain portion and "/" indicates a particular page served by portal server 1000. In response to the redirect, client device 120 launches captive portal 340 and accesses "/" on portal server 1000 to load portal JS (not shown). Portal JS detects "http://" in the browser address bar and swaps "https://" into the URL without issuing a redirect. Doing so causes client device 120 to access secure server 1010 on port 443 of capture device 110 and load HTML form 122 and JS 322. Secure server 1010 performs a secure socket layer (SSL) handshake using a certificate issued for *.wiforms.com by a CA. A "secure" indication appears in captive portal alongside "https." HTML form 322 can then be filled out, signed, and submitted across HTTPS without triggering any browser warnings.

The "secure" indication appears because the various criteria discussed above are met. Specifically, the certificate is issued by a trusted CA, is issued for *.wiforms.com (the domain where captive portal 340 is pointed), and the certificate is not expired. Captive portal 340 cannot detect that resolver resolves http://portal.wiforms.com to the static IP address of capture device 110. All three validity checks are passed and so the "secure" indication appears. Portal server 1000 does not redirect into or away from HTTPS, avoiding browser warnings. Portal server 1000 performs only one 302 redirect and avoids error 310.

Procedure For Encrypting a Captive Portal on an Isolated Web Server

FIG. 11 is a flow diagram of method steps for establishing a secure connection between an isolated web server and a client device, according to various embodiments of the present invention. Although the method steps are described in conjunction with the systems of FIGS. 1-10, persons skilled in the art will understand that any system configured to perform the method steps in any order falls within the scope of the present invention.

As shown, a method 1100 includes a sequence of steps capture device 110 performs to establish an encrypted connection with client device 120. At step 1102, capture device 110 issues client device 120 an IP address via DHCP 300. At step 1104, capture device 110 receives a request for a domain from client device 120. At step 1106, capture device 110 resolve the domain via resolver 310 to a static IP address of capture device 110. At step 1108, capture device 110 redirects the request to a capture domain (e.g., http://portal.wiforms.com) to trigger captive portal 340. At step 1110, capture device 110 transmits a capture page to captive portal 340. The capture page includes portal JS. At step 1112, portal JS detects an unsecured URL prefix (HTTP) and swaps in a secured URL prefix (HTTPS). At step 1114, capture device 110 performs an SSL handshake using a certificate issued by a CA for the capture domain. At step 1116, capture device 110 establishes network communications in a manner that meets the various criteria described to cause the secure indication to appear in captive portal 340 without browser warnings. Capture device 110 performs these steps without needing Internet access.

In sum, a capture device obtains customer data and electronic signatures via a captive portal. The capture device analyzes a digital form provided by a user (typically a business) and automatically configures a digital version of the form for signing. When a client device associated with a customer connects to the capture device, the capture device triggers a captive portal to appear on the client device. The capture device renders the digital form within the captive portal. The customer can then fill out, electronically sign, and submit the form. The capture device generates an audit trail for the electronically signed form based on identifying data captured transparently from the client device. The capture device establishes a secure connection with the client device for enhanced security and to prevent the client device from displaying security warnings.

One technological advantage of the disclosed capture device is that businesses can automatically configure digital forms to be filled out and signed without needing to manually identify each and every field to be filled. Another technological advantage is that customers need not perform an annoying identity verification process in order to facilitate legal electronic signing, because the capture device collects this identifying information directly from the client device. Yet another technological advantage is that the capture device can encrypt network traffic without needing Internet access and without triggering browser warnings. Thus, the disclosed techniques represent multiple technological advancements compared to prior art techniques.

1. Some embodiments include a computer-implemented method for generating electronically signed documents, the method comprising causing a captive portal to appear on a client device when the client device joins a first network, causing the captive portal to display a first web page, obtaining a first electronic signature from the client device based on a first user interaction with the first web page, and generating a first electronically signed document based on the first electronic signature.

2. The computer-implemented method of clause 1, wherein causing the captive portal to appear on the client device comprises redirecting a first request received from the client device, and issuing a status code to the client device in conjunction with redirecting the first request.

3. The computer-implemented method of any of clauses 1-2, wherein causing the captive portal to display the first web page comprises rendering the first web page based on a first electronic form, wherein each of the first web page and the first electronic form includes a first field for gathering user data.

4. The computer-implemented method of any of clauses 1-3, wherein obtaining the first electronic signature from the client device comprises causing the client device to register a sequence of touch events corresponding to one or more gestures performed by the first user with a touch screen associated with the client device.

5. The computer-implemented method of any of clauses 1-4, further comprising obtaining first identifying data from the client device, and generating a first audit trail corresponding to the first electronic signature based on the first identifying data.

6. The computer-implemented method of any of clauses 1-5, wherein obtaining the first identifying data from the client device comprises determining at least one of a media access control address of the client device, a name associated with the client device, a name associated with the first user, global positioning system coordinates associated with the client device, and biometric data associated with the first user.

7. The computer-implemented method of any of clauses 1-6, wherein generating the first audit trail comprises generating a first audit trail entry that includes the first identifying data and a first timestamp indicating when the client device joined the first network, and generating a second audit trail entry that includes the first identifying data and a second timestamp indicating when the first electronic signature was obtained.

8. The computer-implemented method of any of clauses 1-7, wherein generating the first electronically signed document comprises combining a first electronic form with the first electronic signature and the first audit trail.

9. The computer implemented method of any of clauses 1-8, further comprising analyzing a first electronic form to identify a first field, generating a first document interface that indicates a first label corresponding to the first field and a first field type corresponding to the first field, and generating the first web page based on the first document interface, wherein the first web page includes the first label and a first input element corresponding to the first field type.

10. The computer-implemented method of any of clauses 1-9, further comprising obtaining first data via the first input element based on a second user interaction with the first web page, and updating the first document interface to include the first data.

11. The computer-implemented method of any of clauses 1-10, wherein the first document interface further includes first position information corresponding to the first field, and wherein generating the first electronically signed document comprises inserting the first data into the first electronic form based on the first position information.

12. The computer-implemented method of any of clauses 1-11, wherein causing the captive portal to display the first web page comprises performing a computer vision analysis of a first electronic form to generate a first document interface, wherein the first document interface indicates a first structural attribute of the first electronic form, generating the first web page based on the first document interface, wherein the first web page is structured according to the first structural attribute, and transmitting the first web page to the client device to service a first request received from the client device.

13. Some embodiments include a non-transitory computer-readable medium storing program instructions that, when executed by a processor, cause the processor to generate electronically signed documents by performing the steps of causing a captive portal to appear on a client device when the client device joins a first network, causing the captive portal to display a first web page, obtaining a first electronic signature from the client device based on a first user interaction with the first web page, and generating a first electronically signed document based on the first electronic signature.

14. The non-transitory computer-readable medium of clause 13, further comprising the steps of obtaining first identifying data from the client device, wherein the first identifying data includes at least one of a media access control address of the client device, a name associated with the client device, a name associated with the first user, global positioning system coordinates associated with the client device, and biometric data associated with the first user, and generating a first audit trail corresponding to the first electronic signature based on the first identifying data.

15. The non-transitory computer-readable medium of any of clauses 13-14, further comprising the steps of analyzing a first electronic form to identify a first field, generating a first document interface that indicates a first label corresponding to the first field and a first field type corresponding to the first field, generating the first web page based on the first document interface, wherein the first web page includes the first label and a first input element corresponding to the first field type, obtaining first data via the first input element based on a second user interaction with the first web page, and updating the first document interface to include the first data.

16. The non-transitory computer-readable medium of any of clauses 13-15, wherein the first document interface further includes first position information corresponding to the first field, and wherein generating the first electronically signed document comprises inserting the first data into the first electronic form based on the first position information.

17. The non-transitory computer-readable medium of any of clauses 13-16, wherein the step of causing the captive portal to display the first web page comprises performing a computer vision analysis of a first electronic form to generate a first document interface, wherein the first document interface indicates a first structural attribute of the first electronic form, generating the first web page based on the first document interface, wherein the first web page is structured according to the first structural attribute, and transmitting the first web page to the client device to service a first request received from the client device.

18. The non-transitory computer-readable medium of any of clauses 13-17, wherein the step of causing the captive portal to appear on the client device comprises receiving a first request that is transmitted by the client device, and redirecting the first request from a first domain to a second domain.

19. The non-transitory computer-readable medium of any of clauses 13-18, wherein the step of causing the captive portal to display the first web page comprises transmitting a first set of instructions to the client device that causes the client device to transmit a second request to a first web server instead of a second web server, wherein the first webserver performs a secure socket layer handshake with the client device using a first certificate issued by a certificate authority for the second domain to establish an encrypted communication channel with the client device, and transmitting the first web page over the encrypted communication channel.

20. Some embodiments include a system, comprising a memory storing a software application, and a processor that, when executing the software application, is configured to perform the steps of causing a captive portal to appear on a client device when the client device joins a first network, causing the captive portal to display a first web page, obtaining a first electronic signature from the client device based on a first user interaction with the first web page, and generating a first electronically signed document based on the first electronic signature.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating electronically signed documents, the method comprising:
    causing a captive portal to appear on a client device when the client device joins a first network;
    causing the captive portal to display a first web page;
    obtaining a first electronic signature from the client device based on a first user interaction with the first web page;
    generating a first audit trail that includes first identifying information derived from the client device; and
    generating a first electronically signed document based on the first electronic signature and the first audit trail.

2. The computer-implemented method of claim 1, wherein causing the captive portal to appear on the client device comprises:
    redirecting a first request received from the client device; and
    issuing a status code to the client device in conjunction with redirecting the first request.

3. The computer-implemented method of claim 1, wherein causing the captive portal to display the first web page comprises rendering the first web page based on a first electronic form, wherein each of the first web page and the first electronic form includes a first field for gathering user data.

4. The computer-implemented method of claim 1, wherein obtaining the first electronic signature from the client device comprises causing the client device to register a sequence of touch events corresponding to one or more gestures performed by the first user with a touch screen associated with the client device.

5. The computer-implemented method of claim 1, further comprising
obtaining the first identifying data from the client device.

6. The computer-implemented method of claim 5, wherein obtaining the first identifying data from the client device comprises determining at least one of a media access control address of the client device, a name associated with the client device, a name associated with the first user, global positioning system coordinates associated with the client device, and biometric data associated with the first user.

7. The computer-implemented method of claim 6, wherein generating the first audit trail comprises:
generating a first audit trail entry that includes the first identifying data and a first timestamp indicating when the client device joined the first network; and
generating a second audit trail entry that includes the first identifying data and a second timestamp indicating when the first electronic signature was obtained.

8. The computer-implemented method of claim 7, wherein generating the first electronically signed document comprises combining a first electronic form with the first electronic signature and the first audit trail.

9. The computer implemented method of claim 1, further comprising:
analyzing a first electronic form to identify a first field;
generating a first document interface that indicates a first label corresponding to the first field and a first field type corresponding to the first field; and
generating the first web page based on the first document interface, wherein the first web page includes the first label and a first input element corresponding to the first field type.

10. The computer-implemented method of claim 9, further comprising:
obtaining first data via the first input element based on a second user interaction with the first web page; and
updating the first document interface to include the first data.

11. The computer-implemented method of claim 10, wherein the first document interface further includes first position information corresponding to the first field, and wherein generating the first electronically signed document comprises inserting the first data into the first electronic form based on the first position information.

12. The computer-implemented method of claim 1, wherein causing the captive portal to display the first web page comprises:
performing a computer vision analysis of a first electronic form to generate a first document interface, wherein the first document interface indicates a first structural attribute of the first electronic form;
generating the first web page based on the first document interface, wherein the first web page is structured according to the first structural attribute; and
transmitting the first web page to the client device to service a first request received from the client device.

13. A non-transitory computer-readable medium storing program instructions that, when executed by a processor, cause the processor to generate electronically signed documents by performing the steps of:
causing a captive portal to appear on a client device when the client device joins a first network;
causing the captive portal to display a first web page;
obtaining a first electronic signature from the client device based on a first user interaction with the first web page;
generating a first audit trail that includes first identifying information derived from the client device; and
generating a first electronically signed document based on the first electronic signature and the first audit trail.

14. The non-transitory computer-readable medium of claim 13, further comprising the steps of
obtaining the first identifying data from the client device, wherein the first identifying data includes at least one of a media access control address of the client device, a name associated with the client device, a name associated with the first user, global positioning system coordinates associated with the client device, and biometric data associated with the first user.

15. The non-transitory computer-readable medium of claim 14, further comprising the steps of:
analyzing a first electronic form to identify a first field;
generating a first document interface that indicates a first label corresponding to the first field and a first field type corresponding to the first field;
generating the first web page based on the first document interface, wherein the first web page includes the first label and a first input element corresponding to the first field type;
obtaining first data via the first input element based on a second user interaction with the first web page; and
updating the first document interface to include the first data.

16. The non-transitory computer-readable medium of claim 15, wherein the first document interface further includes first position information corresponding to the first field, and wherein generating the first electronically signed document comprises inserting the first data into the first electronic form based on the first position information.

17. The non-transitory computer-readable medium of claim 13, wherein the step of causing the captive portal to display the first web page comprises:
performing a computer vision analysis of a first electronic form to generate a first document interface, wherein the first document interface indicates a first structural attribute of the first electronic form;
generating the first web page based on the first document interface, wherein the first web page is structured according to the first structural attribute; and
transmitting the first web page to the client device to service a first request received from the client device.

18. The non-transitory computer-readable medium of claim 13, wherein the step of causing the captive portal to appear on the client device comprises:
receiving a first request that is transmitted by the client device; and
redirecting the first request from a first domain to a second domain.

19. The non-transitory computer-readable medium of claim 18, wherein the step of causing the captive portal to display the first web page comprises:

transmitting a first set of instructions to the client device that causes the client device to transmit a second request to a first web server instead of a second web server, wherein the first webserver performs a secure socket layer handshake with the client device using a first certificate issued by a certificate authority for the second domain to establish an encrypted communication channel with the client device; and transmitting the first web page over the encrypted communication channel.

20. A system, comprising:

a memory storing a software application; and a processor that, when executing the software application, is configured to perform the steps of:

redirecting a first request that is received from a client device from a first domain to a second domain to cause a captive portal to appear on the client device when the client device joins a first network, transmitting a first set of instructions to the client device that causes the client device to transmit a second request to a first web server instead of a second web server, wherein the first webserver performs a secure socket layer handshake with the client device using a first certificate issued by a certificate authority for the second domain to establish an encrypted communication channel with the client device, transmitting a first web page to the client device over the encrypted communication channel to cause the captive portal to display the first web page, obtaining a first electronic signature from the client device based on a first user interaction with the first web page, and generating a first electronically signed document based on the first electronic signature.

* * * * *